US008749488B2

(12) United States Patent
Lee et al.

(10) Patent No.: US 8,749,488 B2
(45) Date of Patent: Jun. 10, 2014

(54) APPARATUS AND METHOD FOR PROVIDING CONTACTLESS GRAPHIC USER INTERFACE

(75) Inventors: Chung-Hwan Lee, Daejeon (KR); Seung-Woo Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 13/309,749

(22) Filed: Dec. 2, 2011

(65) Prior Publication Data

US 2012/0139838 A1    Jun. 7, 2012

(30) Foreign Application Priority Data

Dec. 6, 2010 (KR) .......................... 10-2010-0123742

(51) Int. Cl.
    *G06F 3/033*    (2013.01)
(52) U.S. Cl.
    USPC .......................................... 345/158; 345/159
(58) Field of Classification Search
    USPC .............................. 345/156, 157, 158; 348/77
    See application file for complete search history.

(56) References Cited

U.S. PATENT DOCUMENTS

| | | | | |
|---|---|---|---|---|
| 5,670,987 A | * | 9/1997 | Doi et al. ..................... | 345/156 |
| 6,147,678 A | * | 11/2000 | Kumar et al. ................. | 345/158 |
| 2003/0214481 A1 | * | 11/2003 | Xiong .......................... | 345/157 |
| 2005/0179655 A1 | | 8/2005 | Ludwig | |
| 2009/0122010 A1 | * | 5/2009 | Murai .......................... | 345/158 |
| 2010/0079411 A1 | | 4/2010 | Lee et al. | |
| 2011/0102570 A1 | * | 5/2011 | Wilf et al. ..................... | 348/77 |
| 2012/0249419 A1 | * | 10/2012 | Bronner et al. .............. | 345/157 |
| 2012/0268373 A1 | * | 10/2012 | Grzesiak ....................... | 345/158 |

FOREIGN PATENT DOCUMENTS

| | | |
|---|---|---|
| KR | 1020080083057 A | 9/2008 |
| KR | 1020100037014 A | 4/2010 |
| WO | 2007/076592 A1 | 7/2007 |

* cited by examiner

*Primary Examiner* — Seokyun Moon
*Assistant Examiner* — Peijie Shen
(74) *Attorney, Agent, or Firm* — Ladas & Parry LLP (57) ABSTRACT

Disclosed herein are an apparatus and method for providing a contactless Graphical User Interface (GUI). The apparatus for providing a contactless GUI includes a basic information management unit, a pointer tracking unit, and a mouse event management unit. The basic information management unit receives finger image information, and generates basic pointer information for a mouse pointer service. The pointer tracking unit analyzes the finger image information based on the basic pointer information, and generates a mouse operation event by tracking a mouse operation in order to control a mouse pointer based on results of the analysis. The mouse event management unit analyzes the mouse operation event, and generates an operation message corresponding to the mouse operation. The pointer tracking unit tracks the mouse operation by calculating the movement distance of the tips of a thumb and an index finger based on the finger image information.

20 Claims, 4 Drawing Sheets

APPARATUS AND METHOD FOR PROVIDING CONTACTLESS GRAPHIC USER INTERFACE

CROSS REFERENCE TO RELATED APPLICATION

This application claims the benefit of Korean Patent Application No. 10-2010-0123742, filed on Dec. 6, 2010, which is hereby incorporated by reference in its entirety into this application.

BACKGROUND OF THE INVENTION

1. Technical Field

The present invention relates generally to an apparatus and method for providing a contactless Graphical User Interface (GUI) and, more particularly, to an apparatus and method for providing a GUI fpr controlling a mouse pointer in a contactless manner.

2. Description of the Related Art

In the field of GUI technology, the use of an interface based on a pointer has been increasing. Representative input devices using such an interface based on a pointer include mouses and touch screens. Such input devices based on a pointer are advantageous in that the manipulation thereof is accurate and commands can be clearly transferred, but is disadvantageous in that the operation thereof can be effected only when contact is made with an additional device.

Meanwhile, a technique for controlling a pointer by recognizing and tracking the motion of a user's finger or a part of the body has a relatively low recognition ratio, and also requires special actions, postures and locations for controlling the pointer because general operations and operations for controlling the pointer cannot be distinguished from each other. Furthermore, the technique is problematic in that it is difficult to make the displacement of a pointer attributable to a user's motion equivalent to the displacement of a mouse from the standpoint of a user.

SUMMARY OF THE INVENTION

Accordingly, the present invention has been made keeping in mind the above problems occurring in the prior art, and an object of the present invention is to provide an apparatus and method for providing a contactless GUI for controlling a mouse pointer using a finger.

In order to accomplish the above object, the present invention provides an apparatus for providing a contactless GUI, including a basic information management unit for receiving finger image information, and generating basic pointer information for a mouse pointer service; a pointer tracking unit for analyzing the finger image information based on the basic pointer information, and generating a mouse operation event by tracking a mouse operation in order to control a mouse pointer based on results of the analysis; and a mouse event management unit for analyzing the mouse operation event, and generating an operation message corresponding to the mouse operation; wherein the pointer tracking unit tracks the mouse operation by calculating the movement distance of the tips of the thumb and the index finger based on the finger image information.

The apparatus may further include a mouse operation execution unit for receiving the operation message from the mouse event management unit, and controlling a performance of the mouse operation corresponding to the operation message on a screen.

The basic information management unit may first recognize fingers for controlling movement of the mouse pointer using the finger image information, recognize the thumb and the index finger, and initialize feature points of the thumb and the index finger.

The basic information management unit may control the sensitivity of movement of the fingers on the screen based on the finger image information.

The basic information management unit may set a Z-axis distance threshold value for tips of the thumb and the index finger, which is necessary to track the mouse operation.

The pointer tracking unit may track the locations of the thumb and the index finger using the feature points of the thumb and the index finger, and convert the difference between the locations of the thumb and the index finger into a 2-D(two-dimensional) movement vector using time series analysis.

The pointer tracking unit may calculate a Z-axis movement distance of the tips of the thumb and the index finger using the 2-D movement vector, and generate the mouse operation event based on results of comparison between the Z-axis movement distance and the Z-axis distance threshold value.

When the Z-axis movement distance is greater than the Z-axis distance threshold value, the pointer tracking unit may generate the mouse operation event for a single click or a double click.

If a click is generated and then a subsequent click is generated within a set time interval, the pointer tracking unit may generate a mouse operation event for a double click.

If a click is generated but a subsequent click is not generated within a set time interval, the pointer tracking unit generates a mouse operation event for the single click.

If the Z-axis movement distance is equal to or smaller than the Z-axis distance threshold value, the pointer tracking unit may generate a mouse operation event for dragging the mouse pointer.

The mouse event management unit may generate a mouse click operation message based on time series analysis when the mouse operation is an operation of performing a click, generate a mouse double click operation message based on time series analysis when the mouse operation is an operation of performing a double click, and generate a mouse drag operation message based on time series analysis when the mouse operation is an operation of dragging the mouse pointer.

Additionally, in order to accomplish the above object, the present invention provides a method of providing a contactless GUI, including receiving finger image information, and generating basic pointer information for a mouse pointer service; analyzing the finger image information based on the basic pointer information; calculating the movement distance of the tips of the thumb and the index finger in order to track a mouse operation based on results of the analysis; generating a mouse operation event using the movement distance of the tips of the thumb and the index finger; and generating an operation message corresponding to the mouse operation by analyzing the mouse operation event.

The method may further include receiving the operation message; and controlling a performance of the mouse operation corresponding to the operation message on a screen.

The generating the basic pointer information may include first recognizing fingers for controlling movement of a mouse pointer using the finger image information; controlling sensitivity of movement of the fingers on the screen based on the finger image information; and recognizing the thumb and the index finger, and initializing feature points of the thumb and the index finger.

The generating the basic pointer information may include setting a Z-axis distance threshold value for the tips of the thumb and the index finger, which is necessary to recognize the mouse operation.

The calculating the movement distance may include tracking locations of the thumb and the index finger using the feature points of the thumb and the index finger; converting a difference between locations of the thumb and the index finger into a 2-D movement vector using time series analysis; and calculating a Z-axis movement distance of the tips of the thumb and the index finger using the 2-D movement vector.

The generating the mouse operation event may include generating the mouse operation event based on results of comparison between the Z-axis movement distance and the Z-axis distance threshold value.

The generating the mouse operation event may include generating a mouse operation event for performing a single click or a double click when the Z-axis movement distance is greater than the Z-axis distance threshold value; and generating a mouse operation event for dragging the mouse pointer when the Z-axis movement distance is equal to or smaller than the Z-axis distance threshold value.

The generating the operation message may include generating a mouse click operation message based on time series analysis when the mouse operation is an operation of performing a click; generating a mouse double click operation message based on time series analysis when the mouse operation is an operation of performing a double click; and generating a mouse drag operation message based on time series analysis when the mouse operation is an operation of dragging the mouse pointer.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

The present invention will be described in detail below with reference to the accompanying drawings. Repetitive descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

Figure 1:
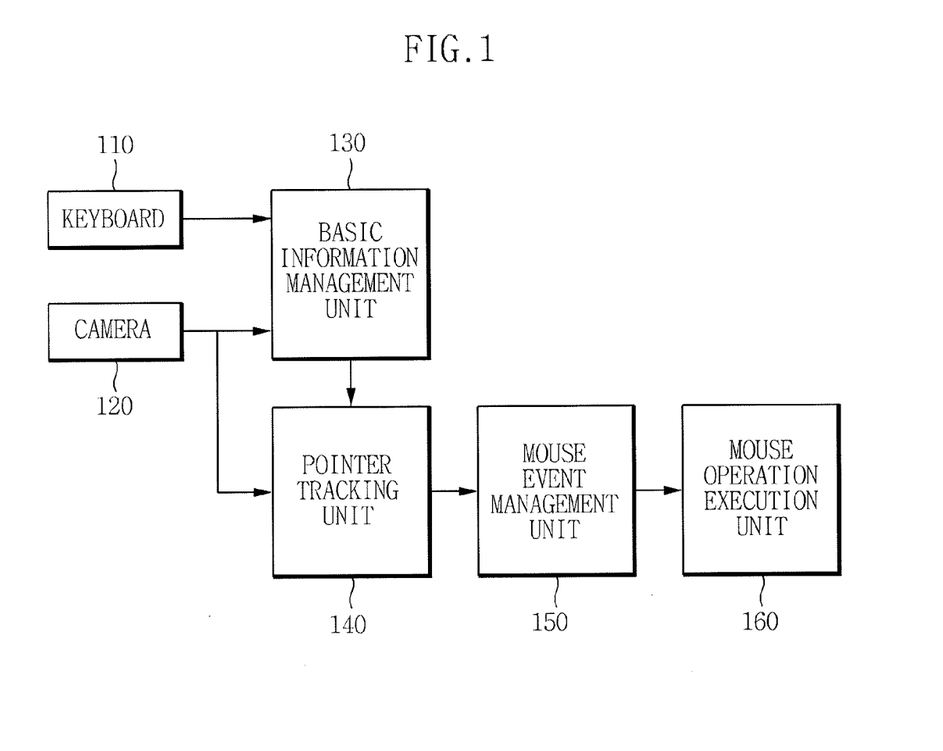
FIG. 1 is a diagram schematically showing an apparatus for providing a contactless GUI according to an embodiment of the present invention.
Figure 2:
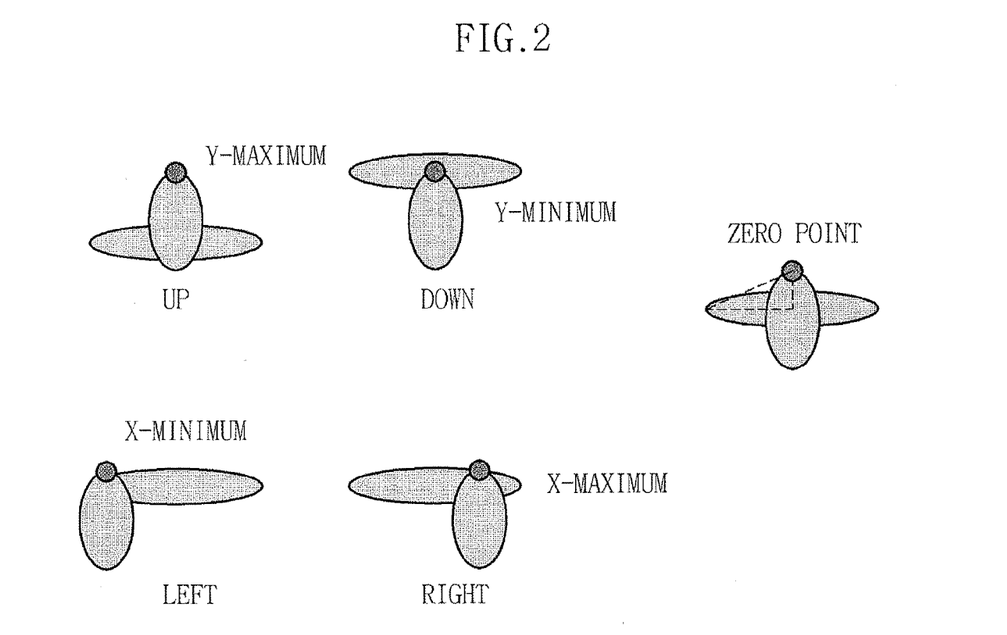
FIG. 2 is a diagram showing an example in which a zero point is determined in the apparatus for providing a contactless GUI shown in FIG. 1.
Figure 3:
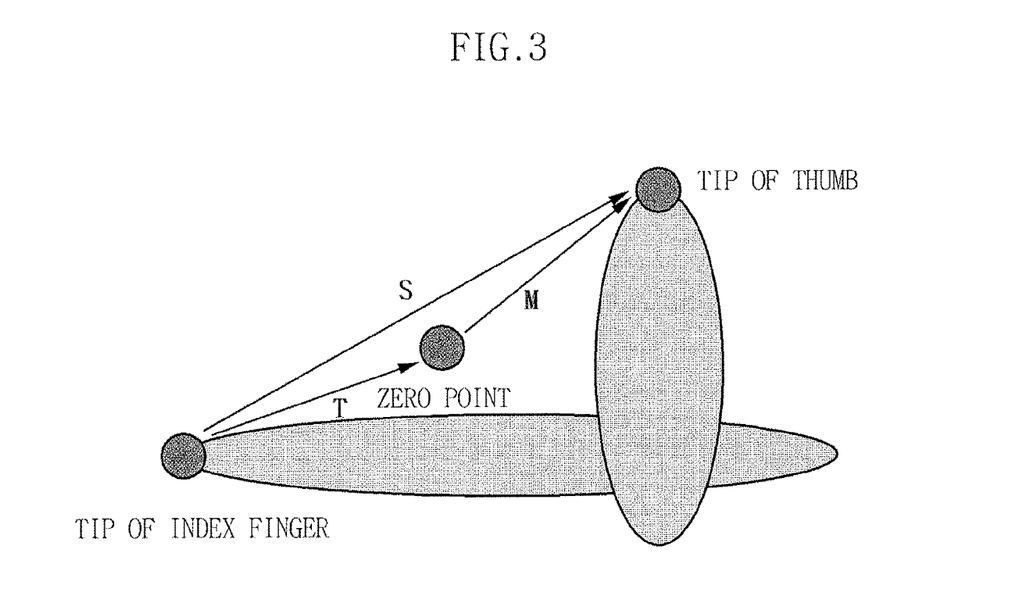
FIG. 3 is a diagram showing an example in which a Z-axis movement distance is calculated in the apparatus for providing a contactless GUI shown in FIG. 1.
Figure 4:
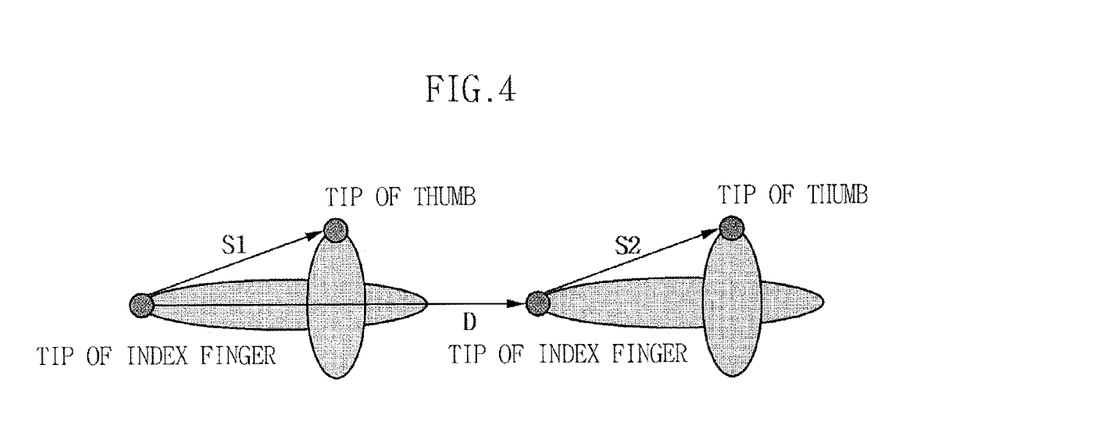
FIG. 4 is a diagram showing an example of a drag operation which is recognized in the apparatus for providing a contactless GUI shown in FIG. 1.
Figure 5:
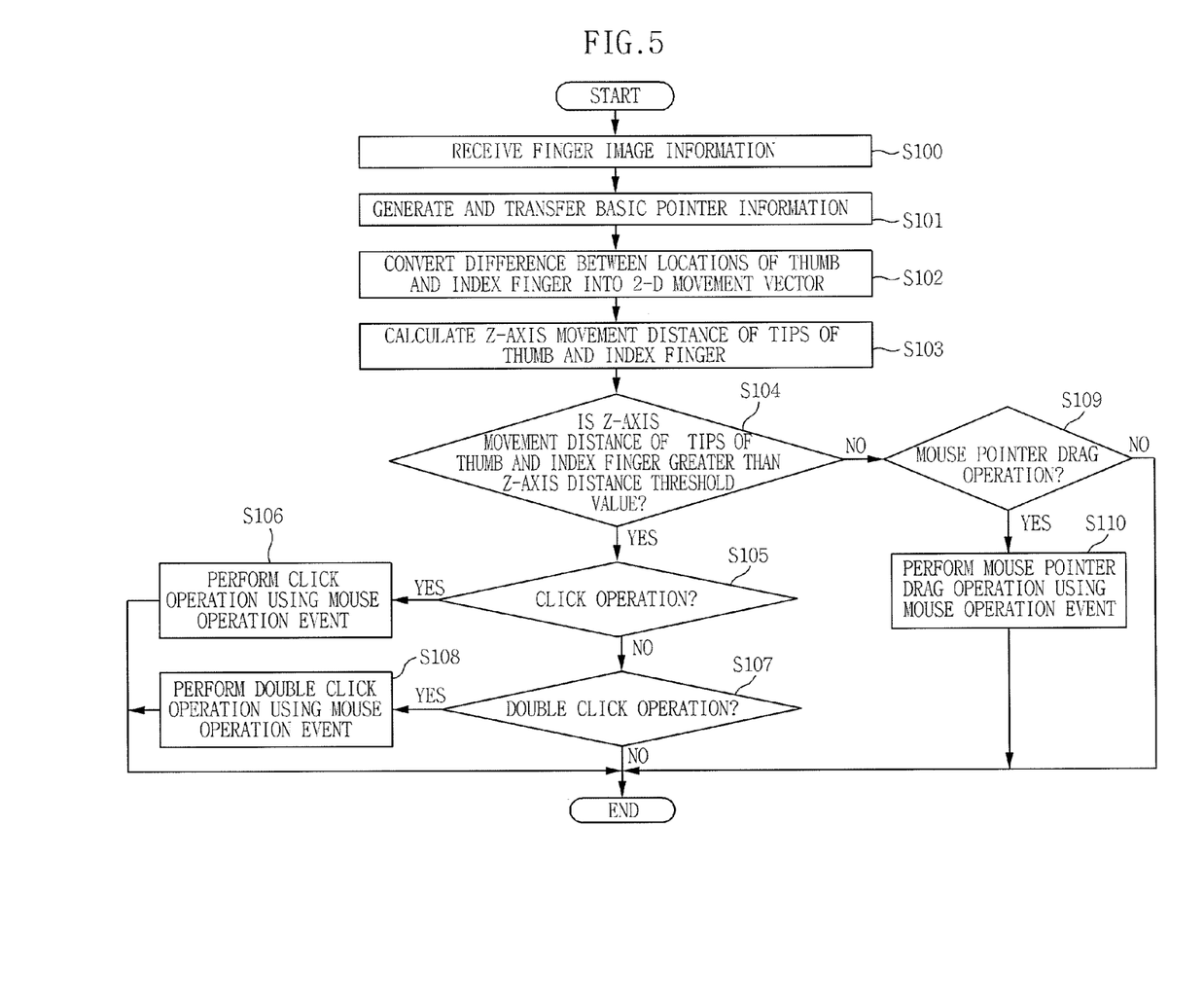
FIG. 5 is a flowchart illustrating the sequence of provision of the mouse pointer service in the contactless GUI provision apparatus shown in FIG. 1.

FIG. 1 is a diagram schematically showing an apparatus for providing a contactless GUI according to an embodiment of the present invention. FIG. 2 is a diagram showing an example in which a zero point is determined in the apparatus for providing a contactless GUI shown in FIG. 1. FIG. 3 is a diagram showing an example in which a Z-axis movement distance is calculated in the apparatus for providing a contactless GUI shown in FIG. 1. FIG. 4 is a diagram showing an example of a drag operation which is recognized in the apparatus for providing a contactless GUI shown in FIG. 1. FIG. 5 is a flowchart illustrating the sequence of provision of the mouse pointer service in the contactless GUI provision apparatus shown in FIG. 1.

As shown in FIG. 1, the apparatus 100 for providing a contactless GUI (hereinafter referred to as the "contactless GUI provision apparatus") according to the embodiment of the present invention provides a mouse pointer service that operates like a mouse in such a way as to control a mouse pointer on a screen in a contactless manner without using an additional input device (e.g., a mouse (not shown) or a touch screen (not shown)).

The contactless GUI provision apparatus 100 includes a keyboard 110, a camera 120, a basic information management unit 130, a pointer tracking unit 140, a mouse event management unit 150, and a mouse operation execution unit 160.

When a user operates a preset specific key or a preset hotkey composed of a specific combination of keys in order to use the mouse pointer service, the keyboard 110 informs the basic information management unit 130 that the corresponding key for starting the mouse pointer service has been pressed. Furthermore, when a user operates a specific key or a hotkey having a specific combination in order to terminate the use of the mouse pointer service, the keyboard 110 informs the basic information management unit 130 that the corresponding key for terminating the mouse pointer service has been pressed.

The camera 120 provides the basic information management unit 130 and the pointer tracking unit 140 with finger image information about an image of the motion of a user's finger.

When the keyboard 110 informs the basic information management unit 130 that the key for starting the mouse pointer service has been pressed, the basic information management unit 130 receives finger image information from the camera 120. Furthermore, the basic information management unit 130 generates and stores basic pointer information for the mouse pointer service based on the finger image information. The basic information management unit 130 transfers the basic pointer information to the pointer tracking unit 140.

In more detail, the basic information management unit 130 first recognizes and stores a finger for controlling the motion of a pointer based on the finger image information. The basic information management unit 110 recognizes the thumb and the index finger among a user's fingers and initiates feature points.

Furthermore, the basic information management unit 130 controls the sensitivity (or ratio) of the movement of a finger on a screen based on the horizontal and vertical resolutions of the finger image information and the difference between the tips of the thumb and the index finger. The sensitivity of the movement is expressed by Equation 1. That is, when the mouse pointer is moved using the directions of and distance between the thumb and the index finger, the basic information management unit 130 controls the sensitivity of the movement so that a mouse pointer is slowly moved (i.e., fine movement) over a short distance and the mouse pointer is rapidly moved over a long distance, using an exponential function e.

$$V = k1 * \exp(d * k2) \quad (1)$$

In Equation 1, V is the moving velocity (pixels/sec), and k1 and k2 are constants that are determined by a user.

The basic information management unit 130 sets, in the finger image information, the center of a point at which the movement of a finger has stopped as a zero point. An example in which the zero point is determined is shown in FIG. 2. That is, the basic information management unit 130 sets maximum and minimum values to which the finger can move in relation to the X and Y axes because the mouse pointer can move up, down, left and right from the current location, and sets the median between the maximum and minimum values as the zero point.

Furthermore, the basic information management unit 130 sets a Z-axis distance threshold value Zm for the tips of the thumb and the index finger, which is necessary to recognize a mouse operation. The Z-axis distance threshold value Zm is expressed by Equation 2. That is, the basic information management unit 130 measures and records variations in the size of the thumb using time series analysis, and sets the Z-axis distance threshold value Zm by converting Sth(t) in a time (t) frame and Sth(t−c) in a time series measurement range c into a Z-axis movement value. In the time series analysis according to the embodiment of the present invention, the locations and movement characteristics of a finger are monitored over time and laws are found and converted into data.

$$Zm = k * (Sth(t) - Sth(t-c)) \quad (2)$$

In Equation 2, Zm is the Z-axis distance threshold value indicating movement in the Z axis, k is a constant, Sth(t) is the size of the thumb in the time frame, and c is the time series measurement range.

Referring back to FIG. 1, the pointer tracking unit 140 receives the finger image information from the camera 120, and receives the basic pointer information from the basic information management unit 130. The pointer tracking unit 140 analyzes the finger image information based on the basic pointer information, and generates a mouse operation event by tracking a mouse operation for controlling the mouse. Furthermore, the pointer tracking unit 140 transfers the mouse operation event to the mouse event management unit 150.

In more detail, the pointer tracking unit 140 tracks the locations of the thumb and the index finger on an image screen using the feature points of the thumb and the index finger. The pointer tracking unit 140 converts the difference between the locations of the thumb and the index finger into a 2-D movement vector using time series analysis.

Thereafter, the pointer tracking unit 140 calculates a Z-axis movement distance M for the tips of the thumb and the index finger using the Y and Y components of the 2-D movement vector. An example of the Z-axis movement distance M is shown in FIG. 3. That is, the pointer tracking unit 140 calculates the Z-axis movement distance M using a vector T formed by the zero point and the tip of the index finger and a vector S formed by both tips of the thumb and the index finger.

Thereafter, the pointer tracking unit 140 generates a mouse operation event by tracking a mouse operation by comparing the Z-axis movement distance M with a Z-axis distance threshold value Zm, and transfers the generated mouse operation event to the mouse event management unit 150.

In more detail, if the Z-axis movement distance M is greater than the Z-axis distance threshold value Zm, the pointer tracking unit 140 determines that the mouse pointer must be operated based on a single click or a double click. Furthermore, the pointer tracking unit 140 records the time when a click was first generated, and determines whether a subsequent click has occurred. If a subsequent click is generated within a set time interval, the pointer tracking unit 140 determines that two separate clicks have been generated, and generates a mouse operation event so that the mouse pointer can perform a double click. If a subsequent click is not generated within a set time interval, the pointer tracking unit 140 determines that a single click has been generated, and generates a mouse operation event so that the mouse pointer can perform a single click.

Meanwhile, if the Z-axis movement distance M is equal to or smaller than the Z-axis distance threshold value Zm, the pointer tracking unit 140 determines whether the coordinates of the tip of a finger have moved (D) in the state in which the difference between the locations of the thumb and the index finger has not varied. If it is determined that the coordinates of the tip of a finger have moved (D) in the state in which the difference between the locations of the thumb and the index finger has not varied, the pointer tracking unit 140 determines that a mouse pointer should perform a drag operation. An example of the drag operation is shown in FIG. 4. That is, if the coordinates of the tip of a finger have moved (D), the pointer tracking unit 140 generates a mouse operation event so that a mouse pointer can perform a drag operation. If the coordinates of the tip of a finger have not moved (D), the pointer tracking unit 140 determines that an operation for controlling the mouse has not been performed, and stops tracking the mouse pointer.

Referring back to FIG. 1, the mouse event management unit 150 receives a mouse operation event from the pointer tracking unit 140. The mouse event management unit 150 determines a mouse operation by performing time series analysis on the mouse operation event. That is, the mouse event management unit 150 determines whether the mouse operation is the operation of performing a single click, the operation of performing a double click, or the operation of dragging the mouse pointer. Furthermore, the mouse event management unit 150 generates an operation message for performing a corresponding operation, and transfers the operation message to the mouse operation execution unit 160.

In more detail, if the mouse operation is the operation of performing a single click as a result of the analysis of the mouse operation event, the mouse event management unit 150 generates a mouse click operation message, and transfers it to the mouse operation execution unit 160. If the mouse operation is the operation of performing a double click as a result of the analysis of the mouse operation event, the mouse event management unit 150 generates a mouse double click operation message, and transfers it to the mouse operation execution unit 160. If the mouse operation is the operation of dragging the mouse pointer as a result of the analysis of the mouse operation event, the mouse event management unit 150 generates a mouse drag operation message, and transfers it to the mouse operation execution unit 160.

The mouse operation execution unit 160 receives the mouse click operation message, the mouse double click operation message, and the mouse drag operation message from the mouse event management unit 150. When the mouse click operation message is received, the mouse operation execution unit 160 operates so that the mouse pointer on a screen performs a click and a corresponding operation is performed. When the mouse double click operation message is received, the mouse operation execution unit 160 operates so that the mouse pointer on a screen performs a double click and a corresponding operation is performed. Furthermore, when the mouse drag operation message is received, the mouse operation execution unit 160 operates such that the mouse pointer on a screen is dragged and a corresponding operation is performed.

FIG. 5 is a flowchart illustrating the sequence of provision of the mouse pointer service in the contactless GUI provision apparatus shown in FIG. 1.

As shown in FIG. 5, when the keyboard 110 informs the basic information management unit 130 that a key for starting the mouse pointer service has been operated, the basic information management unit 130 of the GUI provision apparatus 100 according to the embodiment of the present invention receives finger image information from the camera 120 at step S100.

The basic information management unit 130 generates basic pointer information for the mouse pointer service based on the finger image information. Furthermore, the basic information management unit 130 transfers the basic pointer information to the pointer tracking unit 140 at step S101.

The pointer tracking unit 140 receives the finger image information from the camera 120, and receives the basic pointer information from the basic information management unit 130. Furthermore, the pointer tracking unit 140 tracks within the basic pointer information the locations of the thumb and the index finger on a screen using the feature points of the thumb and the index finger and converts the difference between the locations of the thumb and the index finger into a 2-D movement vector using time series analysis at step S102.

The pointer tracking unit 140 calculates the Z-axis movement distance of the tips of the thumb and the index finger using the X and Y components of the 2-D movement vector at step S103. The pointer tracking unit 140 determines whether the Z-axis movement distance of the tips of the thumb and the index finger is greater than a Z-axis distance threshold value at step S104.

If, as a result of the determination at step S104, it is determined that the Z-axis movement distance of the tips of the thumb and the index finger is greater than the Z-axis distance threshold value, the pointer tracking unit 140 determines whether a mouse pointer should perform a click operation at step S105.

If, as a result of the determination at step S105, it is determined that the mouse pointer should perform a click operation, the pointer tracking unit 140 generates a mouse operation event so that the mouse pointer can perform a click operation. The mouse event management unit 150 generates a mouse click operation message by analyzing the mouse operation event so that the mouse pointer can perform a click operation, and transfers the mouse click operation message to the mouse operation execution unit 160. When the mouse click operation message is received, the mouse operation execution unit 160 operates such that the mouse pointer on a screen performs a click and then a corresponding operation is performed at step S106.

If, as a result of the determination at step S105, it is determined that the mouse pointer does not need to perform the click operation, the pointer tracking unit 140 determines whether the mouse pointer should perform a double click operation at step S107.

If, as a result of the determination at step S107, it is determined that the mouse pointer must perform the double click operation, the pointer tracking unit 140 generates a mouse operation event such that the mouse pointer can perform a double click. The mouse event management unit 150 generates a mouse double click operation message by analyzing the mouse operation event so that the mouse pointer can perform a double click, and transfers the mouse click operation message to the mouse operation execution unit 160. When the mouse double click operation message is received, the mouse operation execution unit 160 operates so that the mouse pointer on a screen is double clicked and a corresponding operation is performed at step S108.

If, as a result of the determination at step S107, it is determined that the mouse pointer does not need to perform the double click operation, the pointer tracking unit 140 determines that an operation of controlling the mouse has not been received, and terminates the tracking.

Meanwhile, if, as a result of the determination at step S104, it is determined that the Z-axis movement distance of the tips of the thumb and the index finger is equal to or smaller than the Z-axis distance threshold value, the pointer tracking unit 140 determines whether the mouse pointer should perform a drag operation at step S109.

If, as a result of the determination at step S109, it is determined that the mouse pointer should perform a drag operation, the pointer tracking unit 140 generates a mouse operation event so that the mouse pointer can perform the drag operation. The mouse event management unit 150 analyzes the mouse operation event and generates a mouse drag operation message so that the mouse pointer can perform the drag operation, and transfers the mouse drag operation message to the mouse operation execution unit 160. When the mouse drag operation message is received, the mouse operation execution unit 160 operates such that the mouse pointer is dragged across the screen and a corresponding operation is performed at step S110.

If, as a result of the determination at step S109, it is determined that the mouse pointer does not need to perform the drag operation, the pointer tracking unit 140 determines that an operation of controlling the mouse has not been received, and terminates the tracking.

As described above, the present invention has the advantage of operating a mouse pointer more accurately because the contactless GUI provision apparatus 100 according to the present invention generates basic pointer information for providing a mouse pointer service based on finger image information and performs control so that a mouse point operation is performed on a screen in accordance with results of the analysis of a mouse operation event tracked based on the basic pointer information.

Furthermore, the present invention has the advantage of operating a mouse pointer more conveniently in a contactless manner because a mouse pointer operation is performed without requiring that contact be made with an additional input device, such as a mouse or a touch screen.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for providing a contactless Graphical User Interface (GUI), comprising:
   a basic information management unit for receiving finger image information, and generating basic pointer information for a mouse pointer service, wherein the basic information management unit sets a Z-axis distance threshold value (Zm) based on a size of a thumb using time series analysis in accordance to $Zm=k*(Sth(t)-Sth$ (t−c)) in which k is a constant, Sth(t) is the size of the thumb in time frame t and Sth(t−c) is the size of the thumb in time frame t−c;

a pointer tracking unit for analyzing the finger image information based on the basic pointer information, and generating a mouse operation event by tracking a mouse operation in order to control a mouse pointer based on results of the analysis, wherein the pointer tracking unit tracks the mouse operation by calculating a velocity (V) of a mouse pointer based on a movement distance between a thumb and an index finger in accordance to V=k1*exp(d*k2) in which k1 and k2 are constants and d is the movement distance between tips of the thumb and the index finger; and a mouse event management unit for analyzing the mouse operation event, and generating an operation message corresponding to the mouse operation.

2. The apparatus as set forth in claim 1, further comprising a mouse operation execution unit for receiving the operation message from the mouse event management unit, and controlling a performance of the mouse operation corresponding to the operation message on a screen.

3. The apparatus as set forth in claim 2, wherein the basic information management unit first recognizes fingers for controlling movement of the mouse pointer using the finger image information, recognizes the thumb and the index finger, and initializes feature points of the thumb and the index finger.

4. The apparatus as set forth in claim 3, wherein the basic information management unit controls sensitivity of movement of the fingers on the screen based on the finger image information.

5. The apparatus as set forth in claim 4, wherein the basic information management unit sets the Z-axis distance threshold value (Zm) from the feature points that comprise tips of the thumb and the index finger, which is necessary to track the mouse operation.

6. The apparatus as set forth in claim 5, wherein the pointer tracking unit tracks locations of the thumb and the index finger using the feature points of the thumb and the index finger, and converts a difference between the locations of the thumb and the index finger into a 2-D(two-dimensional) movement vector using time series analysis.

7. The apparatus as set forth in claim 6, wherein the pointer tracking unit calculates a Z-axis movement distance of the tips of the thumb and the index finger using the 2-D movement vector, and generates the mouse operation event based on results of comparison between the Z-axis movement distance and the Z-axis distance threshold value (Zm).

8. The apparatus as set forth in claim 7, wherein when the Z-axis movement distance is greater than the Z-axis distance threshold value (Zm), the pointer tracking unit generates the mouse operation event for a single click or a double click.

9. The apparatus as set forth in claim 8, wherein if a click is generated and then a subsequent click is generated within a set time interval, the pointer tracking unit generates a mouse operation event for a double click.

10. The apparatus as set forth in claim 8, wherein if a click is generated but a subsequent click is not generated within a set time interval, the pointer tracking unit generates a mouse operation event for the single click.

11. The apparatus as set forth in claim 7, wherein if the Z-axis movement distance is equal to or smaller than the Z-axis distance threshold value (Zm), the pointer tracking unit generates a mouse operation event for dragging the mouse pointer.

12. The apparatus as set forth in claim 7, wherein the mouse event management unit generates a mouse click operation message based on time series analysis when the mouse operation is an operation of performing a click, generates a mouse double click operation message based on time series analysis when the mouse operation is an operation of performing a double click, and generates a mouse drag operation message based on time series analysis when the mouse operation is an operation of dragging the mouse pointer.

13. A method of providing a contactless GUI, comprising:
receiving finger image information, and generating basic pointer information for a mouse pointer service;
analyzing the finger image information based on the basic pointer information;
calculating a velocity (V) of a mouse pointer based on a movement distance of tips of a thumb and an index finger in order to track a mouse operation wherein the velocity (V) is in accordance to V=k1*exp(d*k2) in which k1 and k2 are constants and d is the distance between tips of the thumb and the index finger;
setting a Z-axis distance threshold value (Zm) based on a size of the thumb using a time series analysis in accordance to Zm=k*(Sth(t)−Sth(t−c)) in which k is a constant, Sth(t) is the size of the thumb in time frame t and Sth(t−c) is the size of the thumb in time frame t−c;
generating a mouse operation event using the movement distance of the tips of the thumb and the index finger; and
generating an operation message corresponding to the mouse operation by analyzing the mouse operation event.

14. The method as set forth in claim 13, further comprising:
receiving the operation message; and
controlling a performance of the mouse operation corresponding to the operation message on a screen.

15. The method as set forth in claim 13, wherein the generating the basic pointer information comprises:
first recognizing fingers for controlling movement of a mouse pointer using the finger image information;
controlling sensitivity of movement of the fingers on the screen based on the finger image information; and
recognizing the thumb and the index finger, and initializing feature points of the thumb and the index finger.

16. The method as set forth in claim 15, wherein the generating the basic pointer information comprises setting the Z-axis distance threshold value for the tips of the thumb and the index finger, which is necessary to recognize the mouse operation.

17. The method as set forth in claim 16, wherein the calculating the movement distance comprises:
tracking locations of the thumb and the index finger using the feature points of the thumb and the index finger;
converting a difference between locations of the thumb and the index finger into a 2-D movement vector using time series analysis; and
calculating a Z-axis movement distance of the tips of the thumb and the index finger using the 2-D movement vector,
wherein the generating the mouse operation event comprises:
generating the mouse operation event based on results of comparison between the Z-axis movement distance and the Z-axis distance threshold value (Zm),
generating a mouse operation event for performing a single click or a double click when the Z-axis movement distance is greater than the Z-axis distance threshold value (Zm); and generating a mouse operation event for dragging the mouse pointer when the Z-axis movement distance is equal to or smaller than the Z-axis distance threshold value (Zm).

18. The method as set forth in claim 13, wherein the generating the operation message comprises:
   generating a mouse click operation message based on time series analysis when the mouse operation is an operation of performing a click;
   generating a mouse double click operation message based on time series analysis when the mouse operation is an operation of performing a double click; and
   generating a mouse drag operation message based on time series analysis when the mouse operation is an operation of dragging the mouse pointer.

19. A method of providing a contactless GUI, the method comprising:
   receiving finger image information, and generating basic pointer information for a mouse pointer service;
   calculating a velocity (V) of a mouse pointer based on a movement distance of tips of a thumb and an index finger in order to track a mouse operation wherein the velocity (V) is in accordance to $V=k1*\exp(d*k2)$ in which k1 and k2 are constants and d is the distance between tips of the thumb and the index finger; and
   generating a mouse operation event using the calculated velocity (V) of the movement distance of the tips of the thumb and the index finger.

20. The method as set forth in claim 19, further comprising:
   setting a Z-axis distance threshold value (Zm) based on a size of the thumb using a time series analysis in accordance to $Zm=k*(Sth(t)-Sth(t-c))$ in which k is a constant, Sth(t) is the size of the thumb in time frame t and Sth(t−c) is the size of the thumb in time frame t−c; and
   generating an operation message to correspond to the mouse operation event by using the calculated Z-axis distance threshold value (Zm).

* * * * *